3,598,617
FLAME-PROOF COATING COMPOSITION
Lawrence G. Bockstie, Jr., Bradford, Pa. assignor to
Corning Glass Works, Corning, N.Y.
No Drawing. Filed Apr. 25, 1968, Ser. No. 724,271
Int. Cl. C09k 3/28
U.S. Cl. 106—15FP
12 Claims

ABSTRACT OF THE DISCLOSURE

A coating composition comprising (a) an at least partially hydrolyzed tetraalkyl orthosilicate, (b) aluminum oxide, (c) titanium dioxide, (d) silicon dioxide, and (e) a suspension agent, wherein said titanium dioxide and said suspension agent are added to the composition as dry particles having agglomerates greater than about 1 micron in size, and wherein the alkali metal content of said coating composition is such that, upon curing, a coating prepared from said composition contains (f) less than about 0.05% Na, (g) less than about 0.05 K, (h) less than about 0.01% Li, (i) less than about 0.001% Cs, and (j) less than about 0.001% Rb, all percentages being in terms of the oxides of the respective alkali metals.

BACKGROUND OF THE INVENTION

The present invention relates to coating compositions for electrical resistors particularly, film resistors. More specifically, the present invention relates to flame-resistant coatings adapted for the protection of electrical film resistors against burning and smoking due to overload.

Recently, electrical film resistors have come into wide use. Normally, these film resistors comprise a substrate such as glass coated with a thin film of resistor material such as tin oxide, for example. Also, it is known in the art to overcoat these film resistors with a protective layer. The prior art is faced with the problem, however, that these protective coatings very often burn and are destroyed due to the heat resulting from severe overloads on the film resistors. This burning of the resistor coating not only results in the destruction of the resistor itself, but, very often, results in damage to adjacent elements in the system in which it is employed. The consequent damage to electrical equipment and systems from this burning of resistor coatings has led to an intensive search for a flame-proof coating, which will withstand the heat arising from sudden, severe overloads on the resistor.

The film resistors containing the protective coatings of the prior art suffer from the further disadvantage that upon overload the protective coatings not only burn, but also promote external arcing and in some cases tend to short out the circuit in which they are contained. Accordingly, an intensive search has been conducted for a resistor protective coating which will not burn under severe overload and which will inhibit external arcing and assist in opening the overloaded circuit.

It has been proposed to add several conventional flame-retardants to film resistor protective coatings. These efforts, however, have consistently met with failure. Many of these conventional flame-retardants were ineffective to inhibit burning at the extremely high temperatures (400–600° C.) attained in film resistors under high overload.

It has recently been proposed to coat resistors with a composition containing tetraalkyl orthosilicates, aluminum oxide, titanium dioxide, silicon dioxide and a suspension agent. This composition has been found to be more effective than the prior art protective coatings as a flame-resistant resistor coating.

Although constituting an advance over the prior art, these recently proposed coating compositions are not free from drawbacks.

Titanium dioxide and suspension agents such as the bentones are employed in a variety of applications in the coating art and in other areas. They are usually supplied by the manufacturer and utilized in the art in a "cowled" form. "Cowling" is the process of forming a dispersion of a particulate solid in a carrier liquid at high speed and high shear. Titanium dioxide frequently utilized as a filler and pigment and suspension agents are normally most effectively employed in small particle size form. The most advantageous mode of achieving small particle size is by the aforedescribed process of "cowling." Upon "cowling," dispersions of titanium dioxide and the suspension agents are produced containing particles of submicron size. "Cowling" is also believed to be necessary in the preparation of dispersions of these materials and coating compositions containing these dispersions to facilitate the overall mixing process and to avoid segregation of the particles. By segregation is meant the phenomenon whereby the particles agglomerate and settle out of the mixture in which they are incorporated. By "cowling" filler and suspension materials, dispersions containing extremely small particle size suspensions are obtained which do not tend to "settle out" or segregate on standing.

However, in the particular case of flame-proof resistor coating compositions containing tetraalkyl orthosilicates, aluminum oxide, silicon dioxide and titanium dioxide, it has been found that the utilization of cowled titanium dioxide and suspension agents results in a reduction of the pot-life of the coating composition. The mechanism by which the pot-life is reduced is not completely understood. It is theorized, however, that the titanium dioxide and suspension agent act as catalysts in the composition, exerting a degradative effect on the system. It is believed that titanium dioxide and many of the conventional suspension agents catalyze or promote the hydrolysis of the tetraalkyl orthosilicate component of the coating composition to such an extent that the excess alkanol produced by this hydrolysis functions as a gel-forming agent. It will be readily apparent that the formation of a viscous gel in the coating composition will deteteriously affect its coating properties. Measures must then be taken such as dilution with additional solvent to "break" the gel and render it processable as a coating composition. Dilution, however, will have an adverse effect on the properties of the ultimate coating prepared from the diluted composition.

By employing a "cowled" material, the active surface area of the titanium dioxide and suspension agent is greatly increased due to the small particle size of the suspended material, thereby contributing to its catalytic effect on the degradation of the coating composition. It is to be understood, however, that I do not intend to be bound by this proposed theory.

It has been further found that the presence of alkali metal ions in the composition has an adverse effect on the moisture resistance of coatings prepared from these compositions and otherwise contributes to the degradation of the coating. The conventional suspension agents normally supplied in the industry often contain a relatively high percentage of alkali metal ions. The utilization of relatively large amounts of suspension agents and other coating components containing excessive amounts of alkali metal will deleteriously affect the moisture resistance of the resulting coating.

BRIEF DESCRIPTION OF THE INVENTION

I have found that employing a non-cowled titanium dioxide filler and suspension agents having particle agglomerate sizes greater than about 1 micron greatly increases the pot-life of the tetraalkyl orthosilicate base flame-proof coating compositions to which they are added.

I have further found that by adjusting the alkali metal ion content of the coating composition such that a cured coating prepared from the coating composition contains less than about 0.05% sodium, less than about 0.05% potassium, less than about 0.01% lithium, less than about 0.001% cesium, and less than about 0.001% of rubidium (expressed in terms of the oxides), the moisture resistance and overall stability of the coating composition is greatly enhanced.

Briefly, the coating composition of the present invention comprises an at least partially hydrolyzed tetraalkyl orthosilicate, aluminum oxide, titanium dioxide, silicon dioxide and a suspension agent wherein the titanium dioxide and suspension agent are added to the composition as dry particles having a particle agglomerate size greater than about 1 micron and wherein the alkali metal ion content of the coating composition is such that upon curing the coating prepared from the composition contains less than the percentages of alkali metal ions set forth above.

DETAILED DESCRIPTION OF THE INVENTION

Generally, any tetraalkyl orthosilicate in an at least partially pre-hydrolyzed form may be employed. A preferred orthosilicate is tetraethyl orthosilicate. The degree of hydrolysis, except as discussed above in connection with gel formation, is not overly critical. Generally, an orthosilicate hydrolyzed to an extent of from about 10 to about 90% may be employed in the compositions of the present invention. Generally, amounts of the tetraalkyl orthosilicate ranging from about 5 to about 55% may be employed. In addition to tetraethyl orthosilicate, other alkyl esters may be employed such as, for example, the methyl, propyl, butyl, esters, etc.

Amounts of aluminum oxide ranging from about 4 to about 95% may be included in the coating composition of the present invention.

Silicon dioxide is added to the coating composition for the purposes of inhibiting the tendency of the coatings prepared from these compositions to crack during the following curing. In my co-pending application Ser. No. 724,220, filed Apr. 25, 1968, I have described the inhibitory effect of silicon dioxide on this tendency of tetraalkyl orthosilicate based coating compositions to crack. Generally, amounts ranging from about 1 to about 48% of crystalline silicon dioxide having a particle size in the range of from about 100 to about 325 mesh may be employed.

The titanium dioxide component acts as a "functional filler" in the coating composition of the present invention. In addition to its function as a filler, the $TiO_2$ also aids in the processing and handling of the composition by operating as a suspension agent. The $TiO_2$ also functions as a pigment in the coating composition. Generally, amounts of $TiO_2$ ranging from about 1 to about 45% may be employed. Additional conventional fillers and/or pigments may be added to the composition where desired.

Any conventional suspension agent may be employed in the coating compositions of the present invention. Suitable suspension agents include the organic derivatives of the various montmorillonites such as the alkyl ammonium montmorillonites, etc., commonly known as the bentones. Additional suspension agents include amorphous silica, clays such as the montmorillonites and diatomaceous earths such as kieselguhr. Generally, the alkyl ammonium montmorillonites are the preferred suspension agents and may be employed in an amount ranging from 0.1 to 2.0%.

As stated above, adding the titanium dioxide filler and suspension agent in non-cowled form such that the particle agglomerate size of the additives is greater than about 1 micron greatly increases the pot-life of the overall coating composition. Generally, particle agglomerates having a size in the range of from about 1 to about 150 microns are suitable. Agglomerate sizes in this range have been found to combine the best properties of facilitating processing of the coating composition and increased pot-life. By "agglomerate" is meant a cluster or bundle of particles which exist in the composition as discrete units.

If desired, a solvent may be added to the coating composition. Suitable solvents include the lower alkanols, methylethyl ketone, dimethyl formamide, diacetone alcohol, dimethyl sulfoxide, toluene, xylene, trichloroethylene, tetrachloroethylene, trichloroethane, N-methylpyrrolidone, iso-octane, hexane, benzene, dioxane, etc. Isopropanol is the preferred solvent. Generally, amounts of solvent ranging from about 0 to about 20% may be employed.

The elimination of the cowling step in the processing of the titanium dioxide and suspension agents is advantageous for another reason. Cowling is a time consuming and relatively expensive process. By eliminating this step, the overall expense and time involved in preparing the coating compositions of the present invention are greatly reduced.

It will be recalled from the discussion above that "cowling" of titanium dioxide and conventional suspension agents is believed to be necessary in the art in order to facilitate incorporation in other systems and to avoid segregation or "settling-out" of the particles. Although the utilization of non-cowled materials has been found to produce advantageous results as explained above, the disadvantageous results normally associated with "non-cowled" materials are not produced in connection with the tetraalkyl orthosilicate based coating compositions of the present invention. That is, even though non-cowled titanium dioxide and suspension agents are employed in the compositions of the invention, no problems such as incomplete mixing, segregation, etc., arise.

It is essential in order to obtain a moisture resistant coating meeting the exacting requirements of the electrical industry, that the alkali metal ion content of the coating composition be adjusted such that cured coatings prepared from these compositions contain less than the hereinabove indicated maximum percentage limits. Conventional suspension agents generally contain fairly high percentages of alkali metal ions. Accordingly, a reduction in the amount of suspension agent employed over those heretofore suggested, results in a corresponding reduction in the alkali metal ion content. It is to be understood, however, that the amounts of any of the ingredients of the coating compositions may be adjusted to achieve the required alkali metal ion concentrations.

Alternatively, the ingredients of the coating composition of the invention may be preliminarily purified to reduce their alkali metal ion content prior to incorporation in the coating composition. This purification may take the form of cold water or hot water leaching since most alkali metal compounds are water soluble. Those that are not water soluble are less likely to have an effect on the moisture resistance of the ultimate coating. It is to be understood, however, that any purification method may be employed to reduce the alkali metal ion content.

The exact mechanism by which the alkali metal ions affect the moisture resistance and otherwise contribute to the overall degradation of the coatings of the present invention is not completely understood. It is theorized that a high alkali metal ion content will render the coating electrically conductive at high temperatures encountered during overload. Moreover, in the presence of high humidity free alkalies cause electrolysis of the tin oxide film. Being conductive, the resistor would not open the circuit under severe overload thereby leading to short circuiting and damage to other components in the circuit.

These problems are more apt to occur if the alkali metal is in salt form and capable of being liberated in free ionic form in the presence of water. If the alkali metals are chemically bound in complex insoluble silicates, for example, there is less danger of deterioration of the coating in the presence of moisture. However, in cases of severe overload, these complex alkali metal compounds may decompose to loose the alkali metals in salt form. Hence, it is always desirable to rid the coating composition ingredients of all alkali metal constituents.

The moisture resistance of the coated resistors are tested in accordance with the standard method MIL-STD-202B. Method 106A (May 31, 1957). The results of this test are normally expressed in terms of ΔR percentages. The maximum ΔR allowed in each particular case is dependent on the size of the resistor. Generally, ΔR percentages below about 1% have been accepted as meeting the MIL-STD requirements for moisture resistance.

The coating compositions of the present invention may be coated on the resistor according to any of the conventional coating methods; e.g., dip, spray, brush, roller, etc. Generally sufficient material is applied to the resistor to give a final cured coating between 5 and 10 mils, preferably between 5 and 7 mils, thick. It is especially preferred, although not mandatory, to apply two coats to the resistor. The coating is cured by heating at elevated temperatures, usually up to about 250° C.

The invention will be illustrated by the following non-limiting examples.

EXAMPLE 1

A coating composition was prepared according to the following recipe:

| Component: | Parts by weight |
| --- | --- |
| Aluminum oxide | 2160 |
| Silicon dioxide | 540 |
| Titanium dioxide | 453 |
| Suspension agent (Bentone 27) Alkyl ammonium montmorillonite | 24 |
| Pigment (Cobaltous aluminate+chromic oxide) | 225 |
| Pre-hydrolyzed tetraethyl orthosilicate | 915 |
| Isopropanol, anhydrous | 204 |

A spectrographic analysis of each of the components employed in the above composition for their alkali metal content revealed the following percentages by weight expressed in terms of the oxide of each of the alkali metals.

| Constituent | Li | Na | K | Rb | Cs |
| --- | --- | --- | --- | --- | --- |
| Orthosilicate | ND | ND | ND | ND | ND |
| Aluminum oxide | 0.005 | 0.03 | 0.01 | ND | ND |
| Silicon dioxide | 0.001 | 0.01 | 0.01 | ND | ND |
| Titanium dioxide | 0.001 | 0.05 | 0.05 | ND | ND |
| Bentone 27 | 1.0 | 0.25 | 0.1 | ND | ND |
| Pigment | 0.01 | 0.15 | 0.05 | ND | ND |

NOTE.—ND=not detected.

The titanium dioxide added was in a non-cowled form and had a particle-agglomerate size of about 50 microns (325 mesh).

The suspension agent (Bentone 27) was also employed in a non-cowled form and had a particle-agglomerate size of about 50 microns (325 mesh).

The coating composition had a pot-life of more than six weeks.

The composition was double-coated on glass-tin oxide film 1K resistors having a 4 watt rated power and cured at 250° C. to yield a coating 10 mils thick. The cured coating was found to have a total alkali metal content (as oxides) of approximately 1.02 grams or 0.04%. The coated resistors were tested for moisture resistance according to MIL-STD-202B Method 106A and found to have an average ΔR of 1.0%.

Upon being subjected to an overload of 100 times rated power, the resistor opened the circuit with no burning or flaming. There was no evidence of external arcing and the coating was found to be non-conductive during overload.

The following example is illustrative of the results achieved employing a coating composition high in alkali metal ion content.

EXAMPLE 2

A coating composition was prepared according to the following recipe:

| Component: | Parts by weight |
| --- | --- |
| Aluminum oxide | 2160 |
| Silicon dioxide | 540 |
| Titanium dioxide | 453 |
| Suspension agent (Bentone 27) Alkyl ammonium montmorillonite | 24 |
| Pigment (Cobaltous Aluminate+chromic oxide) | 225 |
| Pre-hydrolyzed tetraethyl orthosilicate | 915 |
| Isopropanol, anhydrous | 204 |

The components were not selected for low alkali content as in Example 1. The $TiO_2$ and suspension agent components were the same as in Example 1.

The thus prepared coating composition was coated on resistors identical to that and under the same conditions as in Example 1. The cured coating was found to have an alkali metal content (as oxides) of 10.0 grams or 0.4%.

The moisture resistance test indicated an average ΔR of >3.0%, indicating that the increased alkali metal content in the composition deleteriously affected its moisture resistance.

Upon being subjected to an overload of 100 times rated power the coating was found to be conductive and there was evidence of some external arcing, thereby indicating the deleterious effects of high alkali metal content on the dielectric properties of the coating.

The following example is illustrative of the results achieved employing a coating composition containing cowled suspension agent and $TiO_2$.

EXAMPLE 3

A coating composition was prepared according to the following recipe:

| Component: | Parts by weight |
| --- | --- |
| Aluminum oxide | 2160 |
| Silicon dioxide | 540 |
| Titanium dioxide (cowled) | 453 |
| Suspension agent (Bentone 27) (cowled) alkyl ammonium montmorillonite | 90 |
| Pigment (cobaltous aluminate+chromic oxide) | 225 |
| Pre-hydrolyzed tetraethylorthosilicate | 915 |
| Isopropanol, anhydrous | 204 |

The particle size of the suspension agent was about 0.1 micron while the $TiO_2$ had an average particle size of about 0.05 micron.

The resulting composition was found to have a pot-life of only about 1 week, before it deteriorated into a thick, viscous gel, thereby indicating the deleterious effect of cowled suspension agents and the titanium dioxide on the pot-life of the composition.

Throughout the specification and appended claims, all coating component perecentages are by weight based on the total coating composition except as otherwise indicated.

I claim:
1. The non-conductive coating composition, which does not burn and which inhibits electrical arcing upon electrical overload adapted for coating electrical resistors which consists essentially of:
 (a) from about 5 to about 55% of an at least partially hydrolyzed tetraalkyl orthosilicate which is
  (i) hydrolyzed to an extent of from about 10 to about 90%, and
  (ii) having an alkyl component selected from the group consisting of methyl, ethyl, propyl and butyl;
 (b) at least about 4% aluminum oxide;
 (c) from about 1 to about 45% titanium dioxide;
 (d) from about 1 to about 48% silicon dioxide having less than about 0.05% K, less than about 0.1% Li, less than about 0.01% Cs and less than about 0.001% Rb, said percentages of said alkali metals being by weight, based upon the total cured coating composition, in terms of the oxides of the respective alkali metals.

2. A non-conductive coating composition consisting essentially of (a) an at least partially hydrolyzed tetraalkyl orthosilicate present in an amount of from about 5 to about 55%, (b) aluminum oxide present in an amount of at least about 4%, (c) titanium dioxide present in an amount of from about 1 to about 45%, (d) silicon dioxide present in an amount from about 1 to about 48% and (e) a suspension agent present in an amount of from about 0.1 to about 2.0%, said percentages being percent by weight, wherein said titanium dioxide and said suspension agent are present in the composition as agglomerates greater than about 1 micron in size, and wherein the alkali metal content of said coating composition is such that a cured coating contains less than about 0.5% Na, less than about 0.05% K, less than about 0.01% Li, less than about 0.001% Cs, and less than about 0.001% Rb, said percentages of said alkali metals being by weight, based upon the total cured coating composition, in terms of the oxides of the respective alkali metals.

150 microns.

8. The composition of claim 1 wherein said suspension agent is selected from the group consisting of alkyl ammonium montmorillonites, amorphous silica, clays and diatomaceous earth.

9. The composition of claim 8 wherein said clay is montmorillonite.

10. The composition of claim 2 further including a solvent.

11. The composition of claim 10 wherein said solvent is isopropanol.

12. The composition of claim 10 wherein said solvent is present in an amount of from about 0.5 to about 20%.

References Cited
UNITED STATES PATENTS

| | | | |
|---|---|---|---|
| 2,380,945 | 8/1945 | Collins | 106—38.8UX |
| 3,206,810 | 9/1965 | Hockin et al. | 106—38.3X |
| 3,412,063 | 11/1968 | Jarboe et al. | 106—38.35X |

ALFRED L. LEAVITT, Primary Examiner

C. K. WEIFFENBACH, Assistant Examiner

U.S. Cl. X.R.

106—38.3, 38.35; 117—137, 215; 252—8.1

UNITED STATES PATENT OFFICE
CERTIFICATE OF CORRECTION

Patent No. 3,598,617          Dated August 10, 1971

Inventor(s) Lawrence G. Bockstie, Jr.

It is certified that error appears in the above-identified patent and that said Letters Patent are hereby corrected as shown below:

Claim 2, line 14, "0.5%: should read -- 0.05% --.

Signed and sealed this 25th day of April 1972.

(SEAL)
Attest:

EDWARD M. FLETCHER, JR.
Attesting Officer

ROBERT GOTTSCHALK
Commissioner of Patents